(12) United States Patent
Blake et al.

(10) Patent No.: US 11,210,576 B2
(45) Date of Patent: Dec. 28, 2021

(54) DEVICE FOR APPLYING TO PACKAGING

(71) Applicant: ARM IP Limited, Cambridge (GB)

(72) Inventors: Geoffrey Wyman Blake, Austin, TX (US); Hugo John Martin Vincent, Cambridge (GB); Amyas Edward Wykes Phillips, Cambridge (GB); Richard William Earnshaw, Fulbourn (GB); Peter Guy Middleton, Great Chesterford (GB)

(73) Assignee: ARM IP Limited, Cambridge (GB)

( * ) Notice: Subject to any disclaimer, the term of this patent is extended or adjusted under 35 U.S.C. 154(b) by 0 days.

(21) Appl. No.: 16/633,560

(22) PCT Filed: Jul. 18, 2018

(86) PCT No.: PCT/GB2018/052035
§ 371 (c)(1),
(2) Date: Jan. 23, 2020

(87) PCT Pub. No.: WO2019/020974
PCT Pub. Date: Jan. 31, 2019

(65) Prior Publication Data
US 2021/0089853 A1 Mar. 25, 2021

(30) Foreign Application Priority Data
Jul. 26, 2017 (GB) ..................... 1712048

(51) Int. Cl.
*G06K 19/07* (2006.01)
*G06K 19/077* (2006.01)

(52) U.S. Cl.
CPC ..... *G06K 19/0717* (2013.01); *G06K 19/0723* (2013.01); *G06K 19/07749* (2013.01)

(58) Field of Classification Search
CPC ........... G06K 19/0717; G06K 19/0723; G06K 19/07749
See application file for complete search history.

(56) References Cited

U.S. PATENT DOCUMENTS

| | | | |
|---|---|---|---|
| 10,282,967 B2 * | 5/2019 | Law | G08B 21/182 |
| 2010/0007501 A1 * | 1/2010 | Yang | B01L 3/545 |
| | | | 340/572.8 |

(Continued)

FOREIGN PATENT DOCUMENTS

| | | |
|---|---|---|
| GB | 2535165 A | 8/2016 |
| WO | 2014058473 A1 | 4/2014 |

OTHER PUBLICATIONS

Notification of transmittal of the International Search Report and the Written Opinion of the International Searching Authority, or the Declaration, App. No. PCT/GB2018/052035, Filed Jul. 18, 2018, dated Oct. 15, 2018, 1 Page.

(Continued)

*Primary Examiner* — Ryan W Sherwin
(74) *Attorney, Agent, or Firm* — Berkeley Law & Technology Group, LLP

(57) ABSTRACT

According to the present techniques there is provided a data processing device, for applying to packaging, the device having a flexible substrate, the flexible substrate comprising: storage circuitry to store device data therein; processing circuitry to process the device data; and communication circuitry to communicate with a remote resource to transmit the device data thereto; sensor circuitry to generate sensed device data, and wherein the device is configured to store the sensed device data in the storage circuitry, process the sensed device data and/or transmit the sensed device data to a remote resource.

14 Claims, 8 Drawing Sheets

(56) References Cited

U.S. PATENT DOCUMENTS

| | | |
|---|---|---|
| 2010/0052215 A1 | 3/2010 | Emond et al. |
| 2014/0097944 A1 | 4/2014 | Fastert et al. |
| 2015/0187234 A1* | 7/2015 | Atkinson ........... G06K 19/0717 |
| | | 40/5 |
| 2016/0048712 A1* | 2/2016 | Butler ..................... H01Q 1/38 |
| | | 340/10.51 |

OTHER PUBLICATIONS

International Search Report, App. No. PCT/GB2018/052035, Filed Jul. 18, 2018, dated Oct. 15, 2018, 4 Pages.
Written Opinion of the International Searching Authority, App. No. PCT/GB2018/052035, Filed Jul. 18, 2018, dated Oct. 15, 2018, 7 Pages.
Combined Search and Examination Report under Sections 17 and 18(3), App. No. GB1712048.6, dated Jan. 29, 2018, 6 Pages.
Smits, et al., "Development of printed RFID sensor tags for smart food packaging," IMCS 2012—The 14th International Meeting on Chemical Sensors, DOI 10.5162/IMCS2012/4.5.2, 4 Pages.
Quintero, et al., "Smart RFID label with printed multisensor platform for environmental monitoring," 2016 IOP Publishing Ltd, DOI: 10.1088/2058-8585/1/2/025003, Downloaded Sep. 2, 2017, 13 Pages.
Notification Concerning Transmittal of International Preliminary Report on Patentability, App. No. PCT/GB2018/052035, dated Feb. 6, 2020, 1 Page.
International Preliminary Report on Patentability, App. No. PCT/GB2018/052035, dated Feb. 6, 2020, 1 Page.
Written Opinion of the International Searching Authority, App. No. PCT/GB2018/052035, dated Feb. 6, 2020, 5 Pages.

* cited by examiner

DEVICE FOR APPLYING TO PACKAGING

CROSS-REFERENCE TO RELATED APPLICATIONS

This application claims the benefit of priority under 35 USC § 371 to International Patent Application No. PCT/GB2018/052035, filed on 18 Jul. 2018 and titled "A Device for Applying to Packaging," and GB Application No. 17 12048.6, filed 26 Jul. 2017 and titled "A Device for Applying to Packaging," the subject matter of such previously filed applications being assigned to the assignee of claimed subject matter and incorporated herein by reference in their entirety.

BACKGROUND

The present techniques relate to the field of data processing devices. More particularly, the present techniques relate to data processing devices, for applying to packaging, to determine a state or characteristic of associated goods. The present techniques also relate to systems having such data processing devices, and methods for determining a state or characteristic of associated goods.

There are ever increasing numbers of equipment within the home that can determine the status of goods using various sensors provided in the equipment.

BRIEF DESCRIPTION OF THE DRAWINGS

The present techniques are diagrammatically illustrated, by way of example, in the accompanying drawings, in which.

DETAILED DESCRIPTION

Figure 1:
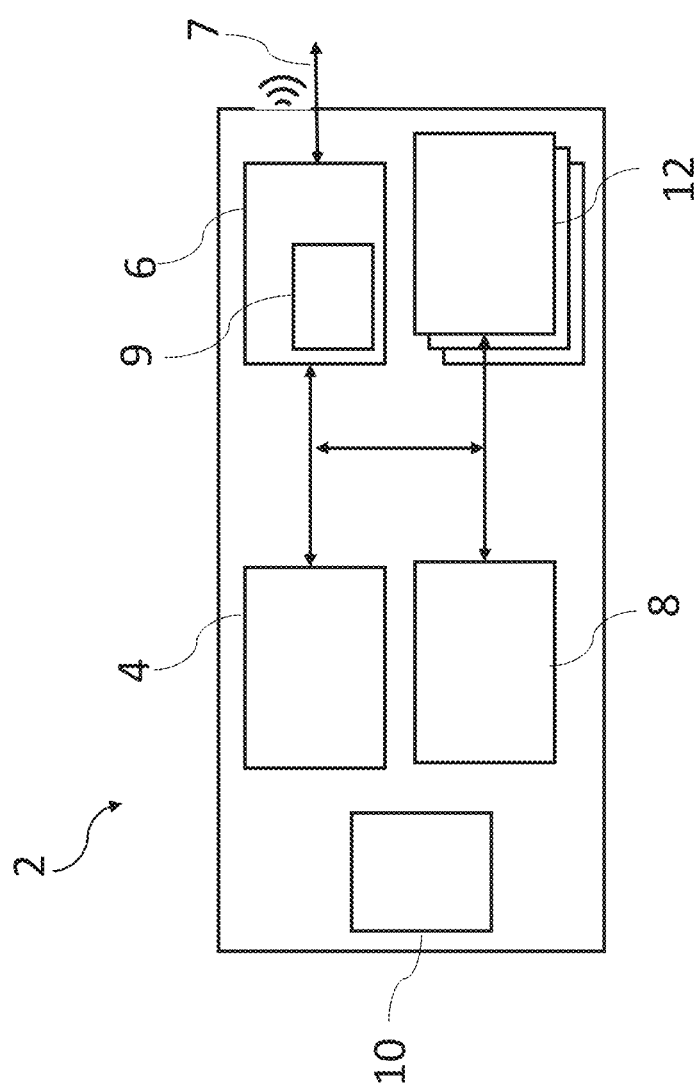
FIG. 1 schematically shows a block diagram of an agent device according to an embodiment.

Smart equipment, such as a refrigerator, may use a combination of sensors, such as cameras, and advanced learning techniques to perform identification of goods. However, such functionality may require user input to allow the smart equipment to "learn" what the product is, or, in the case of a camera, some goods may be obscured from the camera's line of sight and the user must provide additional cameras to cover all lines of sight, resulting in increased expense, or move the goods to we within the camera's line of sight, which may be inconvenient.

According to a first technique there is provided a data processing device, for applying to packaging, the device having a flexible substrate, the flexible substrate comprising: storage circuitry to store device data therein; processing circuitry to process the device data; and communication circuitry to communicate with a remote resource to transmit the device data thereto; sensor circuitry to generate sensed device data, and wherein the device is configured to store the sensed device data in the storage circuitry, process the sensed device data and/or transmit the sensed device data to a remote resource.

According to a second technique there is provided a method of determining a characteristic or state of one or more associated goods from device data provisioned on a device, the method comprising: transmitting, from the device to a remote resource, the device data; processing, at the remote resource, the device data; determining, at the remote resource, the characteristic or state from the processed device data.

According to a further technique there is provided a method of updating data on a device, the method comprising: provisioning, at the device, state data; generating, at the device, sensed data; processing, at the device, the sensed data; updating, at the device, the state data in response to the processed sensed data.

According to a further technique there is provided a method of updating data stored on a device, the method comprising: provisioning, at the device, state data; generating, at the device, sensed data; transmitting, from the device to a remote resource, the state data and sensed data; receiving, at the device from the remote resource, a command communication; updating, at the device, the state data in response to the command communication.

According to a further technique there is provided a method of providing smart functionality with a device, the method comprising: transmitting, from the device to a remote resource, device data; processing at the remote resource, the device data; transmitting, from the remote resource, a command communication to one or more of a second remote resource and a further device to provide smart functionality based on or in response to the device data.

According to a further technique there is provided a computer program product comprising computer code for performing the methods described herein.

According to a further technique there is provided a system comprising:

an agent device as described herein and a first remote resource in communication therewith.

FIG. 1 schematically shows a block diagram of a data processing device 2, hereafter "agent device" 2, which may be a device in the Internet of Things (IOT), and may be a microcontroller or system on chip.

The agent device 2 comprises processing circuitry 4, such as a microprocessor or integrated circuit(s) for controlling various operations performed by the agent device 2.

The agent device 2 also has communication circuitry 6 for communicating with one or more resources remote therefrom such as a data processing device, which may include a mobile telephone, computer terminal, server or a gateway device.

The communication circuitry 6 may use wireless communication 7, such as communication using wireless local area network (Wi-Fi), short range communication such as radio frequency communication (RFID) or near field communication (NFC), or communications used in wireless sensor networks such as ZigBee or Bluetooth, Bluetooth Low Energy (BLE) or 6LoWPAN, using any suitable communications protocol such as lightweight machine-to-machine (LWM2M). Additionally, or alternatively, the communication circuitry may comprise a display 9, capable of generating code such as machine-readable code (e.g. barcodes, QR codes) or human readable code (e.g. text or icons).

The agent device 2 also comprises storage circuitry 8, for storing data provisioned on, or generated, by the agent device 2, hereafter "device data".

Such device data includes identifier data comprising one or more device identifiers to identify the device and may comprise one or more of: universally unique identifier(s) (UUID), globally unique identifier(s) (GUID) and IPv6 address(es), although any suitable device identifier(s) may be used.

A device identifier may also be segmented to identify one or more aspects of the agent device such as: the manufacturer of the agent device 2; a class code of the agent device 2; and one or more capabilities of the agent device 2, such as the communication capabilities (e.g. RFID, BLE), processing capabilities (e.g. processor speed), storage capabilities (e.g. capacity), power capabilities (e.g. battery capacity, type(s) of energy harvester available) and sensing capabilities (e.g. types of sensors available), although this list is not exhaustive.

The identifier data may also include remote resource identifiers identifying the remote resources to which the agent device 2 is to connect, and may comprise a UUID, GUID, IPv6, Universal resource locator (URL) or universal resource identifier (URI).

The identifier data may also include authentication data for establishing trust/cryptographic communications between the agent device 2 and a remote resource. Such authentication data may include certificates (e.g. signed by a root authority), cryptographic keys (e.g. public/private key pairs), tokens etc.

The identifier data may be provisioned on the agent device by any suitable party.

A registry resource (not shown in FIG. 1) may be used to manage the identifier data, whereby managing the identifier data may include generating, maintaining and/or disbanding/retiring the identifier data as appropriate.

Such a registry resource may be provided in a cloud environment as part of a registry service. The registry resource can generate the identifier data and transmit it to another remote resource (e.g. a manufacturer's device) for provisioning on the particular agent device.

Once provisioned with identifier data, an agent device can be tracked (e.g. using the device identifier) and trust/cryptographic communications can be established with a remote resource (e.g. using the authentication data).

The disbanding/retiring of identifier data for an agent device is described below.

The agent device 2 may also be provisioned with, or may generate, other device data as will be described below.

The agent device 2 comprises power circuitry 10 for powering the various circuitry. The power circuitry 10 may comprise a persistent power source such as a battery. The power circuitry 10 may additionally or alternatively include an energy harvester which may charge/recharge the persistent power source. Alternatively, the energy harvester may function as a stand-alone power-source to power the various circuitry (e.g. when a persistent power source is not provided or is not available on the agent device 2).

The agent device 2 also comprises sensor circuitry 12 for generating data, hereafter "sensed data" in response to one or more events/changes in the agent device's 2 environment. As will be described below, the sensed data may be processed by the agent device 2 or transmitted to a remote resource as it is generated. Additionally, or alternatively, the sensed data may be stored in the storage circuitry 8 for later processing by the agent device 2 and/or for later transmission to a remote resource.

The sensor circuitry 12 may include one or more of: a temperature sensor, a chemical sensor (e.g. a gas sniffer), a humidity sensor, a light sensor, a weight sensor, an orientation sensor, an object presence sensor, a fluid level sensor and an accelerometer. It will be appreciated that this list of sensors is not exhaustive and additional, or alternative, sensors may be provided as required by a specific application for which the agent device 2 is used.

In some examples, the sensor circuitry 12 may be fabricated on a separate substrate and provided in electrical communication with the other circuitry 4, 6, 8, 10 using electrical traces as required. The agent device 2 may be fabricated using any suitable fabrication process(es), such as those used to fabricate structures/features for CMOS, Micro-Electro-Mechanical Systems (MEMS) and/or thin-film devices as will be appreciated by a person skilled in the art.

Such processes may include manufacturing techniques such as deposition (e.g. inkjet printing, chemical vapour deposition, spin coating etc.), lithography (e.g. laser or chemical etching) or imprint processes (e.g. molecular imprint). Furthermore, reel-to-reel (R2R) processing may be used, such that individual agent devices may be fabricated on a sheet or roll, and may be removeable from the sheet or roll.

In embodiments, the agent device 2 may be applied to goods or packaging, whereby, applying an agent device to goods or packaging, covers applying or embedding the agent device within primary packaging which provides an enclosure for the goods (e.g. shrink-wrap, envelope, paperboard, blister pack, cans, bottle etc.) and/or secondary packaging providing an enclosure for the primary packaging (e.g. boxes, cartons, containers, crates etc.)

Such goods may include foodstuffs, beverages, medicines, electronics etc., although this list is not intended to be exhaustive.

When applied to packaging for goods, the agent device 2 may be provisioned with data relating to the state or characteristics of the goods, hereafter "state data". The state date may be provisioned by any party using a remote resource (e.g. a data processing device).

As an illustrative example, the state data may include an identifier relating to one or more of: the type of goods, quantity, batch no, goods manufacturer, goods supplier, date of manufacture; date of shipping to supplier; date of receipt by supplier; current expiration date, recommended retail price (RRP) and weight although this list is not exhaustive.

The state data may be queried by the agent device and/or by a remote resource to determine a state or characteristic of the associated goods to which the agent device is applied.

The agent device 2 may also be provisioned with data relating to the operation of the agent device, hereafter "operational data", whereby the operational data may be specific for the goods to which the agent device is applied and, whereby the operational data may be used by the agent device 2 or a remote resource to verify the status of state data provisioned on the agent device in response to the conditions in which the packaging having the agent device applied thereto is stored, and to update the state data accordingly.

For example, the operational data may specify operating parameters outside of which a state of the associated goods may degrade or deteriorate, and such operating parameters may include one or more of: temperature parameters (e.g. min/max temperature thresholds), orientation parameters (e.g. ±X degrees to vertical/horizontal), humidity parameters (% thresholds), weight parameters (e.g. min/max weight thresholds) and gas parameters (e.g. ppm thresholds), although this list is not exhaustive.

The operational data may also detail the actions that should be taken when an agent device generates sensed data which falls outside of the specified operating parameters.

For example, the operational data may specify that the associated goods should be discarded when a sensed temperature falls outside of a specified temperature range or when the sensed temperature falls outside of a specified temperature range for a specified duration (e.g. seconds, minutes, hours). In another example, the operational data may specify that the associated goods should be discarded when a specific humidity or specific gas profile is sensed, or when a particular weight is sensed.

The operational data may also comprise instructions for a device (e.g. agent device or remote resource) to update the state data in response to the sensed data. For example, the operational data may comprise an algorithm to enable the agent device or a remote resource to calculate an updated expiration date for the associated goods based on one or more sensed temperature measurements, sensed humidity measurements, sensed gas measurements, sensed light measurements, sensed orientation measurements etc.

Such an algorithm may specify the rate of deterioration (a decay function) of a particular goods item in response to the actual sensed data, such that the expiration date in the state data may be recalculated and updated on the agent device in response to the decay function.

As a further example, the operational data may comprise an algorithm to enable the agent device or a remote resource to calculate an updated quantity of associated goods and to update the state data accordingly.

As a further example, the operational data may comprise an algorithm to enable the agent device or a remote resource to calculate an updated RRP of associated goods and to update the state data accordingly, whereby the updated RRP may be displayed on the display (e.g. in text form, or using a machine-readable code such as a barcode).

It will be appreciated that the device data (e.g. identifier data, state data, operational data) may be provisioned by any suitable party or parties. For example, a manufacturer of the agent device may provision the identifier data, whilst a goods manufacturer, supplier or user may provision operational data and state data, although the claims are not limited in this respect.

Figure 2:
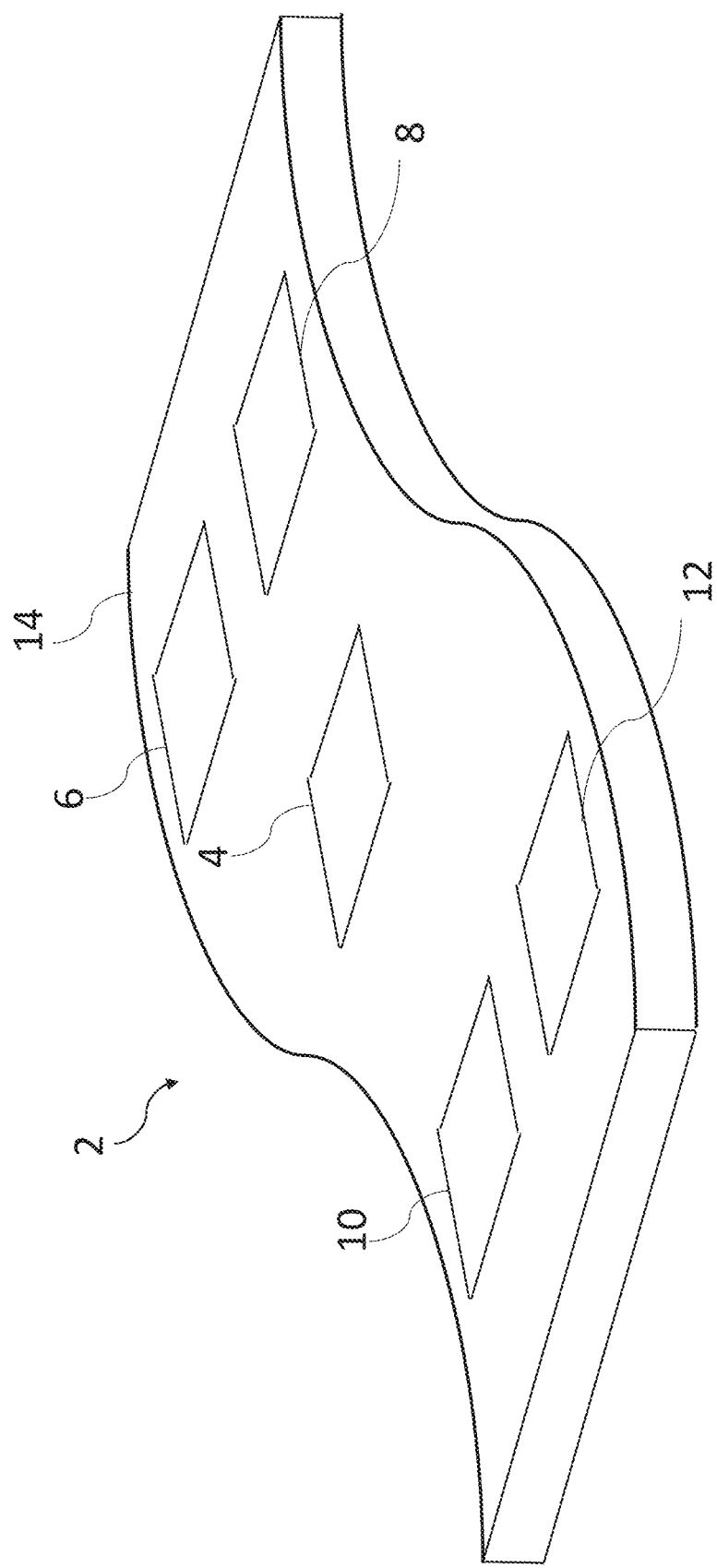
FIG. 2 schematically shows the agent device of FIG. 1 according to a further embodiment.

In FIG. 2, the agent device 2 is illustratively depicted as a flexible thin film device, whereby the various circuitry 4, 6, 8, 10, 12 comprises thin film circuitry provided on or in a flexible substrate 14, whereby the flexible substrate may comprise one or more metallic and/or polymer layers.

The processing circuitry 4 may comprise electronic components and logic, such as transistors (NMOS, PMOS and/or CMOS transistor arrangements), logic gates (e.g. AND, OR, NAND, NOR etc.), provided on or in the flexible substrate. In embodiments, the processing circuitry may comprise a plastic processor.

The communication circuitry 6 may comprise any suitable circuitry capable of receiving data from, and transmitting data to, a remote resource. In an illustrative example, the communication circuitry may comprise an inkjet-printed radio, comprising circuitry such as backscatter circuitry, Wi-Fi or BLE circuitry. As described above, the communication circuitry 6 may comprise a display (not shown in FIG. 2) such as a flexible thin film transistor (TFT) or electrophoretic ink (E-ink) display to generate code such as machine-readable code and/or human readable code.

The storage circuitry 8 may comprise volatile and non-volatile memory, whilst the power circuitry 10 may comprise a solid-state battery and may additionally, or alternatively, include one or more of: an energy harvester, such as a vibration harvester, a radio frequency (RF) harvester, a light harvester and a thermal energy harvester. As an illustrative example, an RF energy harvester (e.g. RFID, Wi-Fi), may comprise a metallic coil and rectifiers, whereby the RFID energy harvester receives RF energy from a remote device, and, using the rectifiers, converts the RF energy into electrical energy for charging/re-charging the power circuitry 10 and/or powering the various circuitry.

As above, the sensor circuitry 12 may include one or more of: a temperature sensor, a chemical sensor (e.g. a gas sniffer), a humidity sensor, a light sensor, a weight sensor, an orientation sensor, an object presence sensor, a fluid level sensor and an accelerometer.

As an illustrative example, a temperature sensor may comprise a material having a physical property that varies in response to temperature. For example, such a temperature sensor may comprise a material having an electrical resistance and/or a dielectric constant which varies in response to temperature. Additionally, or alternatively, the temperature sensor may comprise digital logic to measure temperature. Such digital logic may comprise transistors provided in a ring oscillator circuit, whereby the temperature may be determined in response to measuring a signal propagating in the ring oscillator circuit.

As a further illustrative example, a chemical sensor is a gas sniffer comprising an active material having one or more property (e.g. electrical current, voltage, resistance etc.) that varies in response to the level of gas in the environment.

As a further illustrative example, a humidity sensor comprises a material (e.g. hygroscopic material) having one or more property (e.g. electrical current, voltage, resistance etc.) that varies in response to the level of humidity in the environment.

As a further illustrative example, a light sensor may comprise a photovoltaic device, having one or more property (e.g. electrical current, voltage, resistance etc.) that varies in response to the level of light in the environment.

As a further illustrative example, a weight sensor may comprise a strain gauge in the form of an elongated conductive wire, whereby the resistance of the wire varies in response to the strain thereon. Alternatively, a piezoelectric material may be used as a weight sensor. It will be appreciated that the weight sensor may also be used to detect impacts, or record shocks or vibrations rather than being limited to detecting weight.

As a further illustrative example, an object presence sensor may comprise a coil whereby the agent device may sense the inductance resulting from the respective wire coils, and whereby the inductance sensed by the agent device varies when an object is in proximity to the coil.

As a further illustrative example, a fluid level sensor may comprise a capacitive sensor whereby the capacitance sensed by the agent device varies as the measured fluid level varies.

Figure 3:
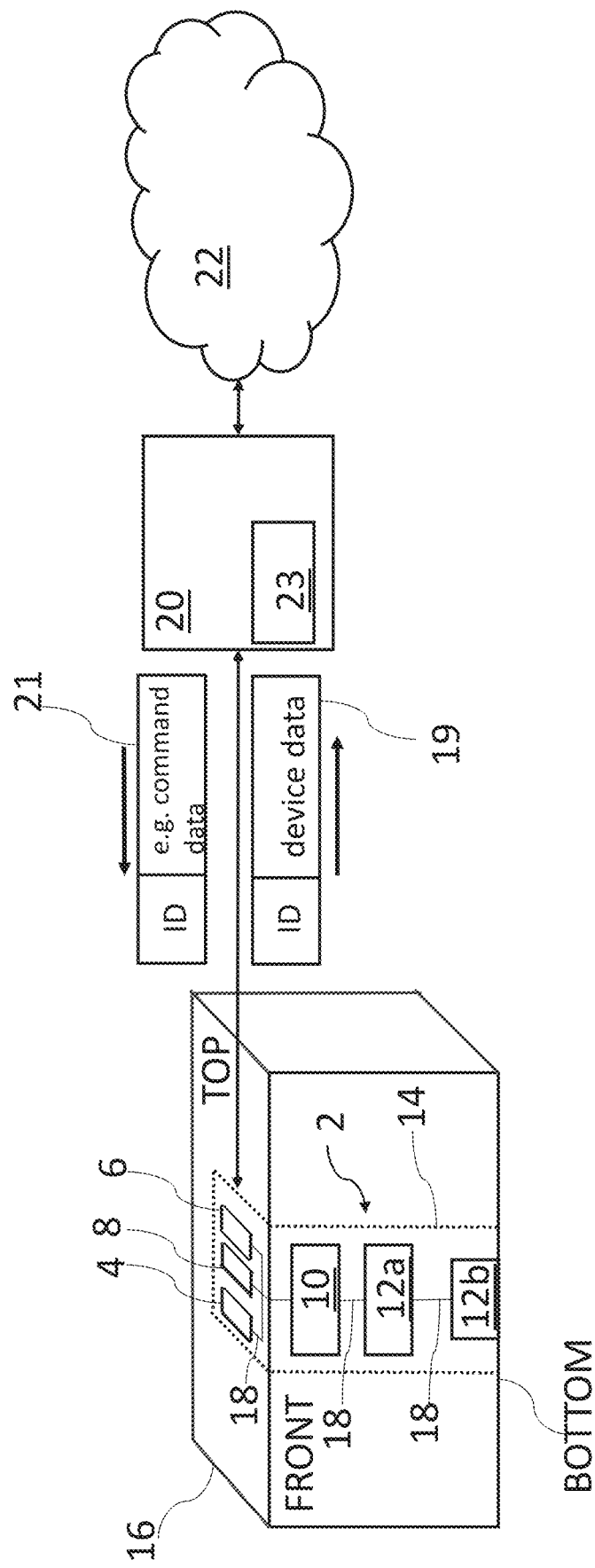
FIG. 3 schematically shows a system comprising the agent device of FIG. 2.

FIG. 3 depicts an agent device 2, provided on packaging 16, having all circuitry 4, 6, 8, 10, 12 provided on or in a flexible substrate 14 as described above in FIG. 2.

As depicted in FIG. 3, the agent device 2 can communicate with a remote resource 20, such as a data processing device, to transmit communications thereto and/or receive communications therefrom.

In the illustrative example, of FIG. 3, the agent device 2 is applied on three different planes of the packaging (TOP, FRONT, BOTTOM) and the sensor circuitry includes two different sensors, a temperature sensor 12a on the FRONT plane and a weight sensor 12b extending between the FRONT and BOTTOM planes. It will be appreciated that references to actual positioning and different planes are for illustrative purposes only and are not intended to be limiting.

Communications 19 from the agent device 2 to the remote resource 20 may be one-way communications, whereby the agent device 2 broadcasts communications using a connectionless protocol. In alternative examples, communications 19 from the agent device 2 may be targeted to one or more remote resources 20, (e.g. using a LWM2M protocol).

As an illustrative example, the agent device 2 may transmit a communication 19 comprising device data including a device identifier (ID) and, when targeted for a specific remote resource, the communication may also include an identifier (e.g. UUID for the remote resource), which may be provisioned on the agent device 2 by the remote resource 20 or another remote resource during a registration process.

Furthermore, the remote resource 20 can also transmit communications 21 to the agent device. Such communications 21 may comprise one or more instructions/commands to be executed by the agent device 2, hereafter "command communication" 21, whereby the command communication 21 comprises command data (e.g. n-bits of data) recognised by the agent device as denoting one or more actions to be undertaken thereby.

Such actions may include instructing the agent device to display a code (e.g. "expiration date is XX/YY/ZZ" or a QR code denoting the expiration data) on the display, to update some or all of the device data thereon and/or transmit some or all of the device data to the remote resource 20, although this list is not exhaustive.

In some examples, the command communication 21 may be signed by the remote resource 20 (e.g. using a private cryptographic key), and verified by the receiving agent device 2 (e.g. using a corresponding cryptographic key provisioned thereon during a registration process).

The agent device 2 may receive a plurality of command communications 21 from different devices, but may discard communications which do not include a recognised device identifier and/or which are not verifiable using the authentication data provisioned thereon. Such functionality means that the agent device 2 does not have to process all communications received thereat, but only those which are targeted thereto and/or which are from a verifiable source.

In operation, the agent device 2 may generate sensed data using the sensor circuitry 12 thereon (e.g. temperature sensor 12a and/or weight sensor 12b), and may store the sensed data in the storage circuitry 8 thereon.

The agent device 2 may actively sense data continuously, whereby the agent device remains powered-on, with the duration between sensed measurements (e.g. milli-seconds, seconds, minutes, hours, days etc.) being specified in the operational data. Alternatively, the agent device 2 may actively sense data periodically, whereby the agent device 2 powers-down for a period of time between measurements to conserve power. The duration between the agent device 2 powering down and powering up (e.g. seconds, minutes, hours, days etc.) may also be specified in the operational data.

Therefore, using the power circuitry provided thereon, the agent device can actively sense data over its entire lifecycle (e.g. from being applied to the packaging through to the goods being discarded), and the sensed data processed using the processing circuitry, transmitted to a remote resource and/or stored in storage circuitry for later processing.

For example, the agent device 2, using the processing circuitry 4, may process the sensed data to verify whether the agent device 2 has sensed data within the parameters specified in the operational data. When the agent device 2 determines that it the sensed data falls outside of the specified parameters, it can take appropriate action which may include displaying a code (e.g. a text, icon, barcode) on the display or updating the state data thereon, although this list is not exhaustive.

It will be appreciated that by processing the sensed data at the agent device 2, the agent device 2 can take appropriate action in real-time without having to wait for communications to be established with a remote resource 20.

However, in some applications it be advantageous for the remote resource 20 to process the device data. Therefore, in addition to, or as an alternative to processing the data thereon the agent device 2 may transmit the sensed data from the storage circuitry to the remote resource 20 for processing thereat, or may transmit the sensed data directly to the remote resource as the sensed data is generated.

When the remote resource 20 determines that the agent device 2 has sensed data outside of the parameters specified in the operational data, the remote resource 20 can take appropriate action such as transmitting a command communication to the agent device 2 to display a code or to update the state data accordingly etc.

Transmitting the sensed data to a remote resource 20 means that the agent device 2 can conserve energy by having the remote resource 20 perform the processing.

Such functionality also provides for one to many querying, whereby the remote resource 20 can request device data from individual agent devices by sending a command communication requesting the device data at an appropriate time.

The remote resource 20 may also interact with a cloud environment 22, which provides one or more services, including data storage & analytics services, management services, application services and registry services although this list is not exhaustive.

In examples, the remote resource 20 may communicate with the cloud environment 22 to check for status updates for the agent device. For example, the remote resource may check for software updates (e.g. operational data updates), for a particular agent device or class of agent device as identified from the identifier data and, when software updates are available, provision the updates on the agent device accordingly.

Additionally, or alternatively, such status updates may relate to the goods associated with the packaging to which the agent device is applied. For example, such status updates may relate to a recall of particular goods, batch of goods, or goods from a particular supplier etc., as identified from the state data. On receiving such status updates, the remote resource 20 can take appropriate action, such as alerting the user as appropriate (e.g. sending a command communication to the agent device 2 to display a code, or by sending an SMS or IM message to a registered user device warning of the recall).

In some examples, the remote resource may not process the device data received from the agent device 2, but may act as a dumb resource, merely transmitting the device data received from agent device 2 to another resource such as the cloud environment 22 for processing thereby, and to transmit communications from the other resource to the agent device 2.

Furthermore, agent devices may receive communications from one or more remote resources, not all of which are targeted threat. Even when a majority of these communications are ultimately discarded by the agent device 2, processing the communications (e.g. to verify a device identifier) may consume power. Therefore, a data queue 23 may be provided (depicted as being provided as part of the remote resource 20), whereby command communications destined for an agent device 2 are stored in the data queue 23 until the agent device 2 is capable of receiving the communications.

The agent device 2 may enter a low power mode, powering down some or the majority of its circuitry for a period of time. When the agent device 2 powers-up it may broadcast a communication e.g. (transmit its UDDI), which is recognised by the remote resource 20 that the agent device 2 is capable of receiving communications therefrom. The remote resource 20 can check whether there are any communications in the data queue 23 for the agent device 2, and, if so, transmit the communications thereto.

Such asynchronous communication with the queue 23 provides that the agent device 2 can power down to conserve energy, yet receive command communications when powered-up. Such functionality may be particularly useful for agent devices 2 having constrained power/processing capabilities.

It may be advantageous to disband some or all or the device data on an agent device at the end of its lifecycle whereby the remote resource 20 may communicate with a registry resource to disband the identifier data. The identifier data, or part thereof (e.g. device identifiers) may then be assigned to another agent device. Alternatively, the registry resource may add the identifier data to a blacklist, which is sent to remote resources registered therewith, whereby the blacklist specifies agent devices which the remote resources should not trust and/or establish communications with.

Additionally, or alternatively, the remote resource may transmit a command communication to an agent device whose identifier data is disbanded, to instruct the agent device to power down some, or all, of the circuitry thereon and/or to indicate to a user that the identifier data has expired (e.g. by generate a code on a display), and that the associated goods should be disposed.

In an example, disbanding the identifier data may be active, whereby the identifier data on a particular agent device is automatically disbanded by the registry resource after a pre-specified duration (e.g. days, weeks, months years etc.)

In alternative examples, disbanding the identifier data may be passive, whereby, for example, the disbanding is reliant on a communication, or lack thereof, from the agent device to a remote resource. Such passive disbanding may include a challenge-response operation between the agent device and remote resource, whereby the remote resource may communicate with the agent device to determine whether the device is functioning within the specified parameter in the operational data. When it is determined that the agent device is functioning within the specified parameters, the identifier data may not be disbanded. However, when it is determined that the agent device is not functioning within the specified parameters, or does not respond to the challenge communication (e.g. due to power failure), the identifier data can be disbanded.

It will be appreciated that agent devices described herein may be applied to packaging for various goods and may be used in a plurality of applications. The following examples of such goods and applications are illustrative only are not intended to be limiting.

Figure 4:
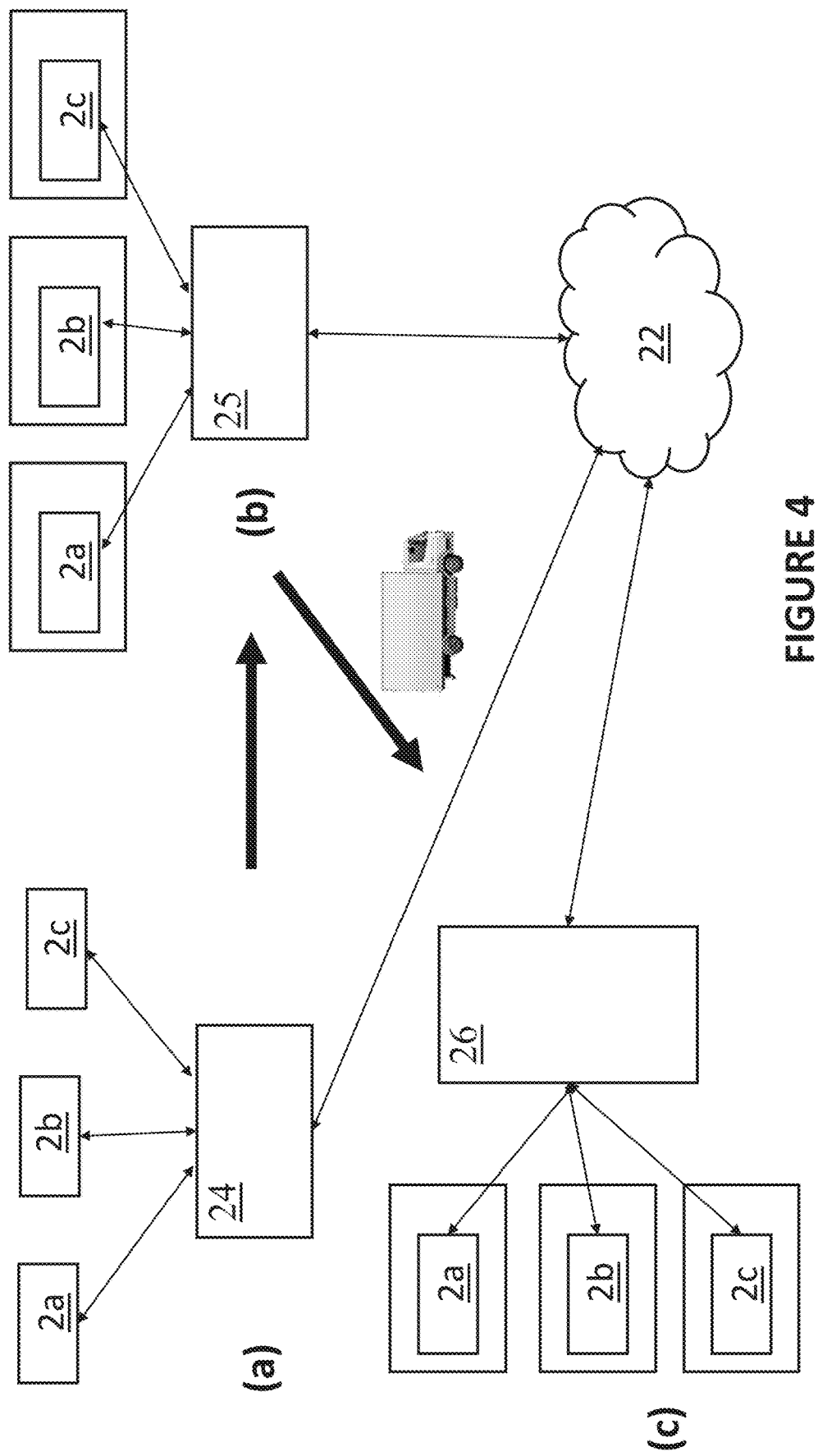
FIGS. 4a to 4c schematically show part of an example lifecycle of agent devices of FIG. 2.

FIGS. 4a to 4c schematically show part of an example lifecycle of agent devices 2a-2c, whereby post-manufacture, the agent devices 2a-2c are provisioned with identifier data using a remote resource such as a data processing device 24 (e.g. by the manufacturer).

As depicted in FIG. 4b, the agent devices 2a-2c are applied to packaging, which, in the present illustrative example, are milk cartons, and, using data processing device 25, are provisioned with state data relating to the respective milk cartons, whereby the state data provisioned on agent device 2a may include: 'type=full fat'; 'batch=549023'; 'supplier ID=11111'; 'date of packaging=01/01/2017'; 'expiration date=31/1/2017'; 'RRP=99p'.

The state data provisioned on agent device 2b may include: 'type=semi-skimmed'; 'batch=549026'; 'supplier ID=11111'; 'date of manufacture=02/01/2017'; 'expiration date=28/1/2017', 'RRP=97p'

The state data provisioned on agent device 2c may include: 'type=UHT'; 'batch=549029'; 'supplier ID=11111'; 'date of manufacture=04/01/2017'; 'expiration date=05/05/2017', 'RRP=1.05p'.

Each agent device 2a-2c may also be provisioned with operational data for the agent device applied to each carton. In the present illustrative example, the operational data may comprise a specified temperature range at which the respective cartons should be stored so as to maintain the respective expiration dates in the state data.

The respective operational data may also include an algorithm, which is used to determine an updated expiration date based on the temperatures actually sensed by the respective agent devices. For example, the respective algorithms may be used to calculate an updated expiration date for the milk based on the length of the time the actual temperature sensed by the respective agent devices is outside the temperature range specified in operational data.

It will be appreciated that the agent devices may actively sense data and process the sensed data and/or store the sensed data thereon.

As depicted by FIG. 4c, the cartons are transported to a first user's store, whereby, for the present illustrative example, the first user is a vendor and the cartons are transported to the vendor's store within a temperature range specified in the operational data.

During transportation, the agent devices 2a-2c can each actively sense data (e.g. sense the temperature and/or weight), and store the sensed data in the storage circuitry.

The agent devices 2a-2c may harvest energy during the transportation stage to power the various circuitry and/or to maintain charge in the battery during transportation. For example, the transportation means (illustratively depicted as a refrigerated vehicle in FIG. 4) may include a Wi-Fi transmitter, whereby the agent devices 2a-2c may harvest the energy from the Wi-Fi transmitter. In other examples, the agent devices 2a-2c may additionally or alternatively harvest energy from any vibrations experienced by the agent devices during transportation.

On arriving at the vendor, the delivery driver or the vendor may query the respective agent devices using remote resource 26, such as a mobile data processing device to request the device data from each agent device 2a-2c to verify the sensed data thereon.

For the present illustrative example, when it is determined that a particular agent device did sense temperatures which fell outside the specified temperature range and/or the weight of a carton is below a specified weight threshold, then the carton to which the particular agent device is applied may be discarded, or the state data updated in response to the sensed data. For example, an updated expiration may be calculated and the state data may be updated accordingly. Furthermore, the RRP in state data may be adjusted (e.g. reduced) in response to the updated expiration date.

In embodiments, a remote resource may be provided within the transportation means, whereby the different agent devices 2a-2c can actively transmit the device data to the remote resource during transportation, whereby the remote resource can monitor the state of the respective agent devices and update the state data throughout the transportation stage. Therefore, on arriving at the vendor, the state of all the agent devices 2a-2c will have been actively determined, and the state data actively updated accordingly.

Having identified the cartons were maintained within the specified parameters, the vendor may store the cartons in a storage unit (e.g. a fridge display) until purchased by a user.

The storage unit may also include a Wi-Fi harvester, which the agent devices 2a-2c can use to harvest energy to power the various circuitry thereof and/or to maintain charge in the battery during storage.

Whilst in the storage unit, a remote resource (e.g. a mobile device or static device within the storage unit) may verify the state of each carton, by querying the device data on the respective agent devices. If any agent device was determined to have sensed temperatures outside the parameters specified in the operational data, that specific carton may be discarded or updated state data (e.g. an expiration date, RRP) generated in response to processing the device data.

Such functionality may be useful in the event of power outages that result in the vendor's storage unit being inadvertently powered off, whereby, rather than merely discarding all of the cartons, or risk selling contaminated food, the vendor can query the state of the cartons with the remote resource and update the expiration dates of the respective agent devices accordingly. Furthermore, rather than discarding all cartons, the vendor may discard only those cartons which have deteriorated beyond the expiration date.

Furthermore, the remote resources with which the agent devices communicate with may provide smart functionality in response to the device data received from the respective agent devices 2a-2c.

As an example of such smart functionality, the remote resources 24, 25, 26 may communicate with the cloud environment 22 to check for status updates and take appropriate action, such as alerting an appropriate party (e.g. manufacturer, vendor etc.) as to any issues (e.g. by transmitting a command communication). Additionally, or alternatively, the remote resources 24, 25, 26 may check for updated device data (e.g. identifier data, state data, operational data etc.) and provision any updated device data on the agent device.

Figure 5:
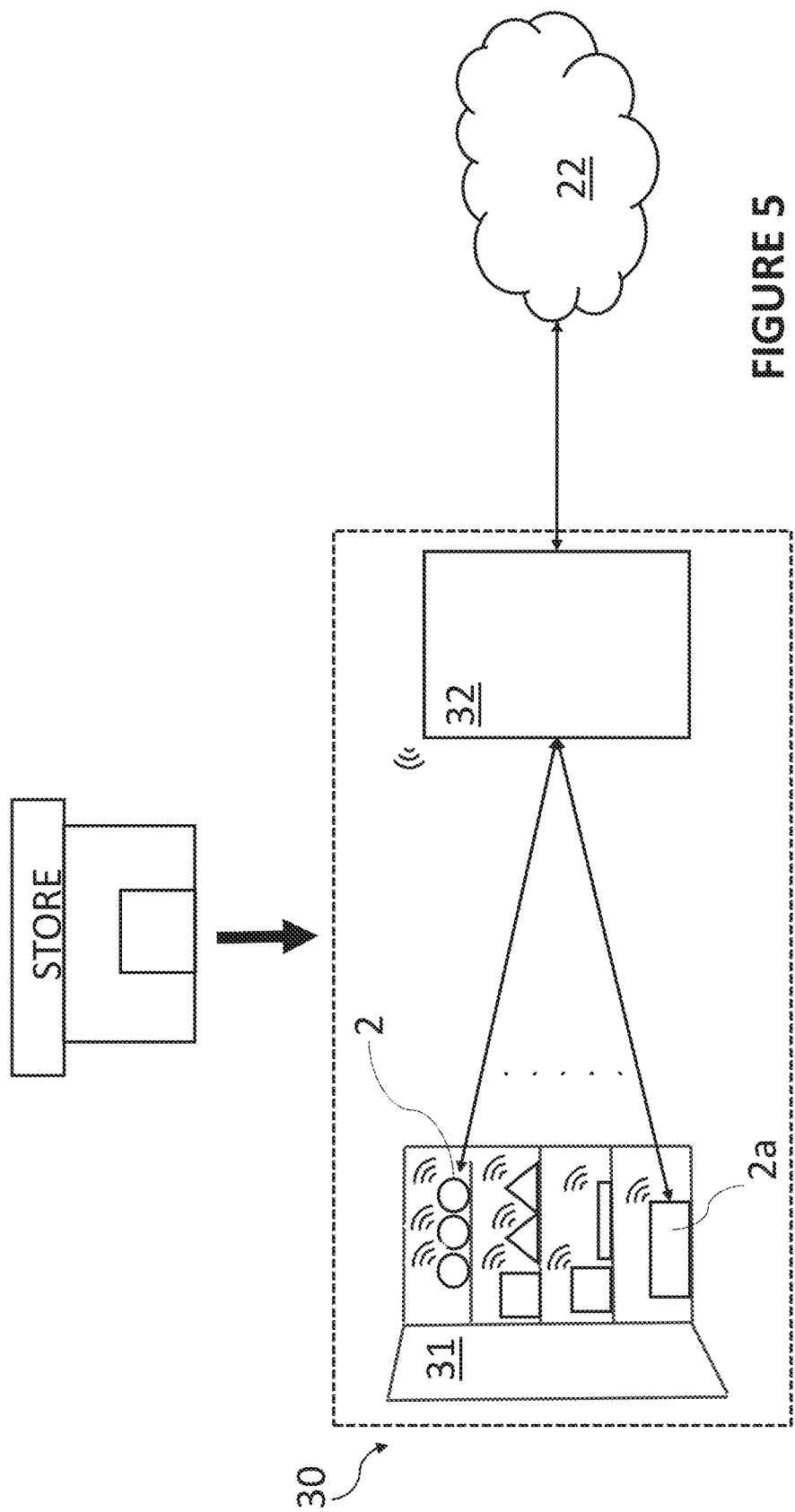
FIG. 5 schematically shows another part of the example lifecycle.

FIG. 5 extends the example lifecycle described in FIGS. 4a-4c above, whereby FIG. 5 depicts a user, which in the illustrative example may be a consumer, who, having purchased the carton with agent device 2a applied thereto, transports the carton to a home environment 30.

During transportation to the home environment 30, the agent device 2a can actively sense data, continuously or periodically, and store the sensed data in the storage circuitry.

As above, the agent device 2a may harvest energy to power the various circuitry and/or to maintain charge in the battery during transportation to the home environment, whereby the transportation means (e.g. a motor vehicle, bus, train) may include a Wi-Fi transmitter such that the agent device 2a may harvest the energy therefrom. In other examples, the agent device 2a may additionally or alternatively harvest energy from any vibrations experienced thereby.

On arriving at the home environment 30, the user may store the carton in a storage unit 31 (e.g. a fridge) whereby the agent device 2a can, continuously or periodically, generate sensed data (e.g. sensing the temperature at which it is stored), and store the sensed data in the storage circuitry.

As above, the agent device 2a may harvest energy in the home environment 30 to power the various circuitry and/or to maintain charge in the battery. For example, the home environment may comprise a Wi-Fi transmitter, such that the agent device 2a may harvest the energy therefrom. In other examples, the agent device 2a may additionally, or alternatively, harvest energy from any vibrations experienced thereby the agent device (e.g. from the storage unit).

Whist the agent device 2a may process the sensed data locally thereon, the present illustrative example depicts a user using a remote resource 32 to process the device data received therefrom. When it is determined that that the agent device 2a has sensed temperatures outside the specified temperature parameters in the operational data, the associated carton may be discarded or updated state data generated.

The agent device 2a can continue to sense the temperature whilst stored in the storage unit 31, and when there is a power failure or, if the efficiency of the storage unit 31 should decrease, the state data (e.g. an expiration date) may be adjusted accordingly. Therefore, by actively sensing the temperature at which the goods were stored between applying the agent device to the packaging and storage of the goods in the storage unit 31, a dynamic expiration date can be calculated, based on inter alia the sensed data generated during that period.

It will be appreciated that dynamically updating the state data may result in reduced wastage for the associated goods, because, rather than discarding the goods following an event (e.g. a power failure), the user may trust the updated state data and consume the goods instead. Such functionality may also lead to improved health and safety, because rather than consuming goods which may have become unsafe, the user may discard the goods based on the updated state data.

It will be appreciated that there may be other goods having agent devices 2 applied thereto within the home environment, each generating device data and/or having device data provisioned thereon. FIG. 5 schematically shows various goods in the storage unit 31, each having an agent device applied thereto.

An agent device may provide active actuation in response to sensed data, whereby such active actuation may include opening a vent in packaging; opening a valve between two parts of a package e.g. to add some extra preservative to extend the life of the goods in the packaging; heating the goods to prevent damage by excessive cooling etc.

The agent device 2 will comprise circuitry to provide the active actuation in response to the sensed data or state data, whereby such circuitry may comprise a coil which may be heated (e.g. by resistive heating) to perforate the packaging by melting (e.g. to open a vent or break a seal). Additionally, or alternatively, such circuitry may comprise a piezo-electric actuator e.g. to open/close a valve in the packaging. As an illustrative example of such active actuation, a product shipped as an organic product may have an initial shelf life of 3 days, but, whereby after 2.75 days, if it's determined that the product has not been used, the agent device 2 will perform active actuation to break a seal (e.g. by heating) so as to release a preservative into the interior of the packaging, such that the goods are no longer organic, but whereby the shelf life of the goods is extended, thereby potentially preventing wastage. The agent device can adjust the state data accordingly to take account of the updated state data.

As above, a remote resource can provide smart functionality in response to the device data received from the different agent devices. As a further example of such smart functionality, the remote resource 32 may transmit a command communication to cause the agent device 2 to provide active actuation and/or to cause the agent device 2 to display the updated expiry date or to display that the associated goods are no longer organic.

As a further example of such smart functionality, the remote resource 32 may communicate with the cloud environment 22 to check for status updates for one or more agent devices in the home environment, and take action accordingly. For example, the remote resource 32 may communicate with the cloud environment 22 to check whether there is a recall on particular goods, batch of goods, or goods from a particular supplier etc. and take appropriate action, such as warning the user. Additionally, or alternatively, the remote resource 32 may check for updated device data (e.g. identifier data, state data, operational data etc.) and provision any updated device data on the agent device.

As further example of such smart functionality, and keeping with the illustrative example of FIG. 5, when there are two or more cartons of milk in the storage unit 31, the remote resource 32 may determine the date order in which the cartons will expire, and alert the user so the cartons of milk can be consumed in date order. For example, the date order may be displayed on the respective agent devices using the respective displays, whereby a carton of milk due to expire first in date order will display a code (e.g. "1", "Drink First", "X days to expiration", or barcode) in response to a command communication received thereat, whilst a carton due to expire second in order will display text or a code (e.g. "2", "Drink Second", "Y days to expiration" or a barcode) in response to command communication received thereat. The user can the read or scan the code to determine the date order.

As a further example of such smart functionality, the remote resource 32 may, by monitoring the device data from all agent devices, determine when the number of cartons, or, using the sensed data from an individual agent device, determine when the level of milk in a specific carton falls below a threshold weight or exceeds a threshold date (e.g. 3 days prior to expiration date), and the remote resource 32 can communicate with an online store (e.g. Ocado®) via the cloud application 22 to place an order for additional cartons, whereby the threshold date, threshold number of cartons in a storage unit, or threshold weight for a specific carton may be set at the remote resource by the user. In some examples, the remote resource 32 may also search online databases (e.g. on the cloud environment) to obtain price reductions for any ordered goods.

As a further example of such smart functionality, the remote resource 32 may access a calendar database for the home environment, and order milk on the basis of the entries in the calendar database. For example, if the user is away from the home environment for a period, the remote resource may transmit a command communication to an appropriate resource to order milk to coincide with the user's return.

As a further example of such smart functionality, the remote resource 32 may generate recipes based on the goods associated with one or more agent devices in the home environment, and communicate (e.g. as a command communication) the suggested recipes to the user. When the user indicates that they are preparing a suggested recipe, the remote resource 32 may also transmit a command communication to cause the goods to display information to the user.

For example, a display on an agent device applied to an egg carton may display "Add first; use four of"; a display on an agent device applied to a milk carton may display "Add second; Use 250 ml"; a display on an agent device applied to a butter tub may display "Add third; Use 50 g" etc.

The remote resource 32 may also interact with other devices (e.g., smart objects) within the home environment to provide smart functionality (e.g. transmit command communications thereto). As an illustrative example, and keeping with the example of preparing a suggested recipe, the remote resource may control an oven in order to maintain a specific temperature or to turn off the oven after a duration.

As a further example of such smart functionality, the remote resource may provide targeted messages for owners of an agent device in response to the sensed data, whereby, and keeping with the illustrative example above, the remote resource may transmit a command communication to a display in the user's home environment (e.g. a display on a fridge) to display a message. As an illustrative example, on determining that milk regularly exceeds its expiry data, the remote resource may cause "Buy longer lasting Cravendale® milk to avoid wastage" to be displayed.

As a further illustrative example of such smart functionality, the remote resource may transmit the device data to an interested party, whereby the interested may be identified using a device identifier provided on the agent device. Such an interested party may be a manufacturer or a distributor of products, whereby the interested party can, for example, analyse sensed data to identify usage information, user trends and/or user habits, and take an action in response to the analysis. Such an action may comprise causing the remote resource to transmit a command communication to a display in the user's home environment. In examples, the user may, via the remote resource (e.g. via a web control panel) control whether the remote resource is authorised to transmit the sensed data to an interested party.

As a further illustrative example, and keeping with the example of FIG. 5, by identifying that the agent devices for different goods in storage (e.g. a refrigerator) all have sensed data outside of specified parameters (e.g. a temperature parameter), the remote resource may determine that the storage unit is malfunctioning and alert a user accordingly.

It will be appreciated from the illustrative examples above, that an agent device can actively sense data throughout its lifecycle, whilst the state of goods associated with an agent device can also be determined/verified throughout the lifecycle, and the state data updated accordingly. Furthermore, a remote resource may provide smart functionality in response to the device data received from one or more agent devices by transmitting a command communication to one more resources/devices.

It will be appreciated that goods (e.g. foodstuffs, beverages, medicines, explosives etc.) may generate a specific gas profile, which may vary as the goods age, whereby an agent device can sense the gas profile of the goods throughout the lifecycle thereof, and detect whether the goods have spoiled or have become contaminated.

Figure 6B:
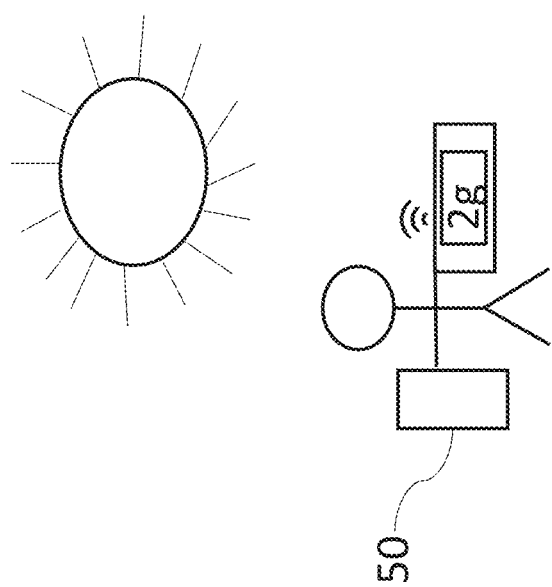
FIGS. 6a to 6b schematically show part of an example lifecycle of the agent device of FIG. 2 according to a further embodiment.
Figure 6A:
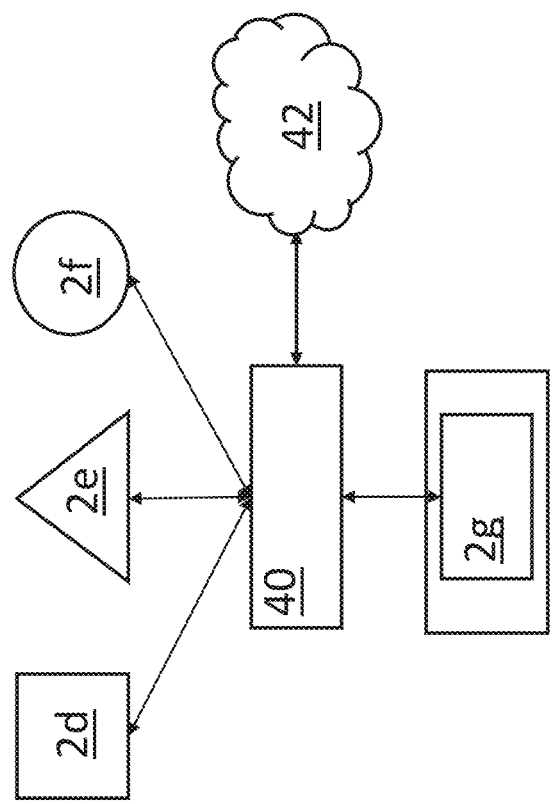

FIGS. 6a and 6b schematically show an illustrative example of agent devices 2d-2g providing such functionality, whereby in FIG. 6a the user prepares a sandwich using ingredients having associated agent devices 2d, 2e, 2f. For example, agent device 2d may be provided on packaging (e.g. a wrapper) for sliced bread, agent device 2e may be provided on packaging (e.g. plastic foil) for sliced ham, and agent device 2f may be embedded within packaging (e.g. a bottle) for mayonnaise.

On preparing the sandwich, the user may use remote resource 40 to obtain device data from each agent device 2d, 2e and 2f, whereby the device data may include state data comprising an expiration date for each ingredient and operational data comprising an algorithm for determining a rate of deterioration for the respective ingredients in response to sensed temperature, gas, humidity, light exposure etc.

The data processing device 40 can calculate an expected expiration date for the sandwich in response to the device data received from the various agent devices 2d-2f. The remote resource 40 may also communicate with a cloud application 42 to obtain any status updates for the respective ingredients. For example, the cloud application 42 may provide the data processing device with an algorithm for calculating an expiration date for the combination of ingredients based on the humidity or temperature, or may provide an algorithm for calculating an updated expiration date based on a particular gas emitted as a particular ingredient or combination of ingredients deteriorates.

A user can then apply an agent device 2g within a sandwich bag, place the sandwich within the sandwich bag and provision the agent device 2g with the device data.

The agent device 2g can sense data in the time between being provisioned with the device data and the user consuming the sandwich. Additionally, or alternatively, the agent device 2g can process the device data, or communicate with remote resource 50 to transmit device data thereto to perform the processing, whereby, in the present illustrative example the remote resource 50 may be a mobile telephone.

The expected expiration date may be updated in response to the sensed data and/or the user notified as appropriate. For example, when it is determined that the sandwich is unsafe the eat (e.g. due to overheating), the mobile device may generate an alert thereon, or instruct the agent device 2g to display a code (e.g. "unsafe" or "X").

As above, the agent device 2g may harvest energy to power the various circuitry and/or to recharge the battery, whereby in the present illustrative example, the user's remote resource 50 may include a Wi-Fi transmitter such that the agent device 2g may harvest the energy from the Wi-Fi transmitter. In other examples, the agent device 2g may additionally or alternatively harvest energy from any vibrations experienced thereby.

Figure 7:
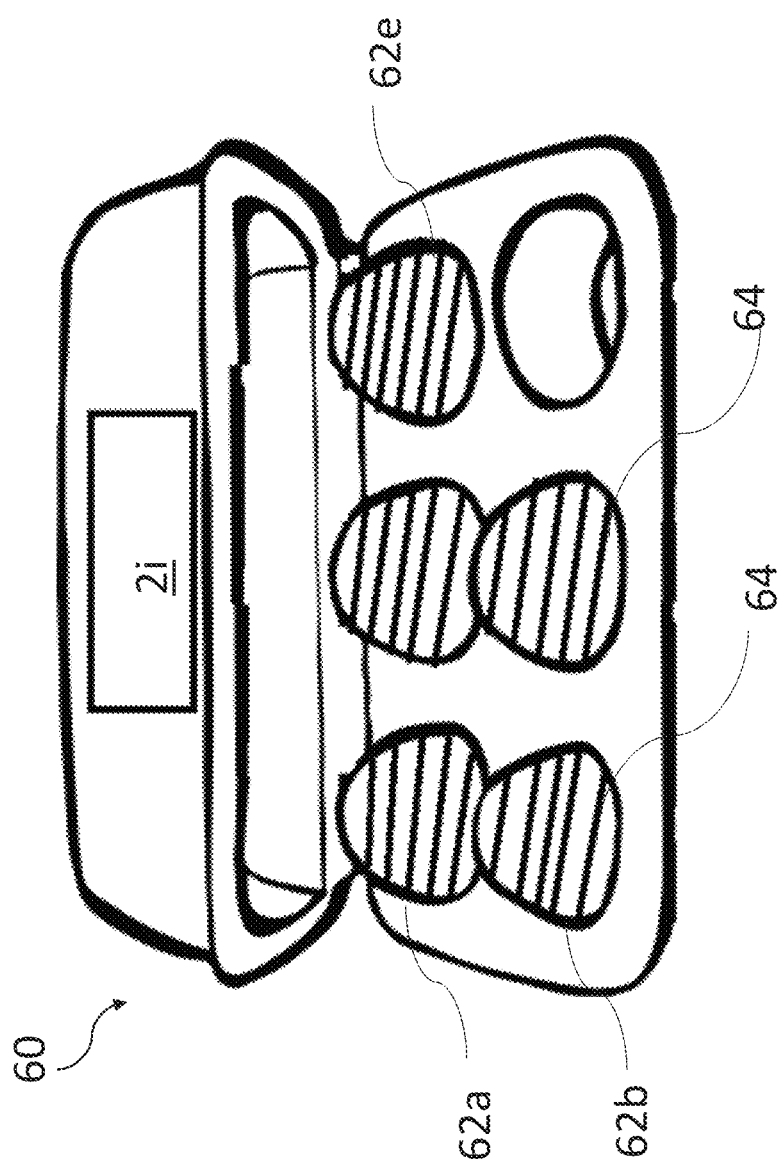
FIG. 7 schematically shows circuitry for use with the agent device of FIG. 2 according to an embodiment.

A further illustrative example of sensing circuitry is shown in FIG. 7, whereby agent device 2i is applied to a carton for eggs 62a-e.

Furthermore, each of the individual eggs 62a-e is provided with an object presence sensor circuitry 64, which in the present example comprises a conductive wire coil, which may be printed directly onto the eggs.

In operation, the agent device may sense the inductance resulting from the respective wire coils, whereby the inductance sensed by the agent device 2i decreases as the number of eggs in the packaging decreases.

The agent device 2i may actively sense the inductance, continuously or periodically, and process the device data and/or transmit the device data to a remote resource for processing, and appropriate action taken in response to processing the device data.

Such appropriate action may be for the remote resource to provide smart functionality by transmitting a command communication to an appropriate resource to re-order eggs when the sensed quantity is below a specified threshold.

Further appropriate action may be for the remote resource to transmit a command communication to the agent device to cause the agent device to update a display thereon. For example, a display on the agent device 2i may be updated to display a code (e.g. "5 eggs remain", or a barcode).

Whilst the illustrative examples of FIGS. 4 to 7 depict agent devices applied packaging to for food, the goods are not limited to food, and agent devices can be applied to packaging for any goods, as will be appreciated by a skilled person having taken account of the present description.

For example, the goods may be medicine, e.g. a prescription tablets or liquid, which should be maintained at a particular temperature to maintain the potency of the medicine.

An agent device may be applied inside the primary packaging (e.g. a bottle) for medicine, whereby the state data provisioned on agent device may include: 'type=lorazepam'; 'batch=7789'; 'pharma manufacturer ID=22222'; 'date of manufacture=20/12/2016'; 'expiration date=20/12/2017'.

The agent device may also be provisioned with operational data. In the present illustrative example, the operational data may specify a temperature range at which the medicine should be stored to maintain the potency of the medicine at least up to the expiration date specified in the state data. As above, the operational data may also include an algorithm, which is used to determine an updated expiration date in response to the temperatures actually sensed by the agent device, and the length of the time the actual temperature was determined to be outside the required temperature range.

The agent device can sense the temperature from when packaged through to consumption by the user, and store the sensed data in the storage circuitry. As above, the agent device can process the device data, or a remote resource can be used to query the device data.

In this manner, a user (e.g. a consumer, pharmacist etc.) can be confident that the medicine was stored correctly at all times.

For example, a consumer may inadvertently leave the pills in a vehicle for a period of time, whereby the temperature in the vehicle exceeds the specified temperature range. In the present illustrative example, the agent device may sense the temperature and process the sensed data locally, taking appropriate action when it's determined that the sensed temperature exceeds the specified temperature. Such appropriate action may be to alert a user or update a display on the agent device accordingly.

Alternatively, the consumer may use a remote resource to query the agent device before taking the medicine to request the device data including the stored sensed temperature data. The remote resource can then take appropriate action based on the processed data. Such appropriate action may be to update a display on the agent device accordingly.

Furthermore, goods may be required to be maintained at particular orientation (e.g. vertical or horizontal), whereby an agent device associated with the goods can sense the orientation of the goods throughout the lifecycle thereof, from manufacture to user (e.g. using an accelerometer). The agent device can process the sensed data, or the device data may be queried using a remote resource. Appropriate action may then be taken when determined that goods were stored outside of the orientation parameters specified in the operational data. For example, the goods may be discarded or compensation sought from an appropriate party.

As an illustrative example, an agent device may be applied to a bottle of wine, and the orientation of the wine monitored from bottling though to consumption. A bottle of wine associated with any agent device not maintained at the required orientation can be monitored and appropriate action taken in response to processing the sensed data. For example, the individual bottles may be discarded or compensation sought when determined to have been stored at an orientation outside of the specified parameters.

As a further illustrative example, goods (e.g. food, electronic equipment, sterile equipment) may be provided within a hermetically sealed package having an inert gas therein for protection or to prevent bacteria ingress etc. Before hermetically sealing the package, an agent device comprising a chemical sensor may be applied within the package, such that when sealed, the agent device comprising the chemical sensor can sense the inert gas. When the level of sensed inert gas falls below a specified threshold, the agent device, or a remote resource, can take appropriate action such as calculating an updated expiration date based on the level of sensed inert gas or causing a code (e.g. "check seal") to be displayed on the display.

As previously described, an agent device may not have any sensor circuitry provided thereon, whereby the device may be provisioned with device data which is queried by a remote resource.

As an illustrative example, the agent device may be applied to a parcel or letter, whereby identifier data provisioned on the agent device provides for tracking of the agent device by a remote resource. Additionally, or alternatively, state data provisioned on the agent device may define the recipient and the address thereof, and whether the correct tariff was paid etc.

In operation, the agent device may transmit its device identifier (e.g. UUID) and state data to a remote resource (e.g. by broadcasting the device data or on receipt of a command communication from the remote resource). The remote resource can then use the device identifier to track the agent device and/or the state data to ensure that the associated parcel or letter is delivered to its destination (e.g. a recipient specified in state data).

With the illustrative examples described above in mind, it will be appreciated that an agent device may be applied to packaging, and a state or characteristic of the associated goods determined from the device data, and appropriate action taken in response to the determined state.

Figure 8:
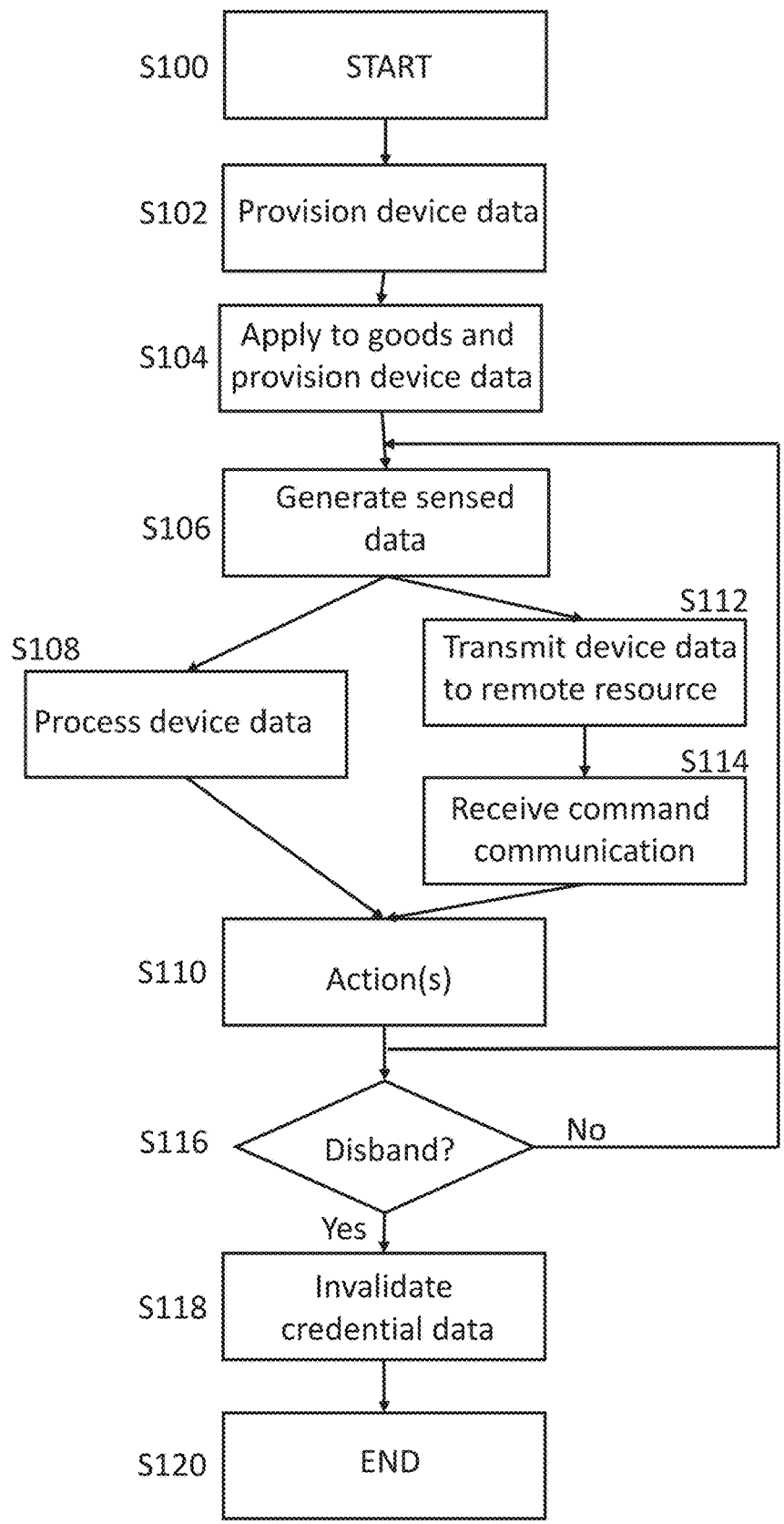
FIG. 8 is a flow diagram of an example lifecycle of the agent device of FIG. 2.

FIG. 8 is a flow diagram of an example lifecycle of the agent device, from manufacture of the agent device through to the disbanding of device data thereon.

The process begins at S100, whereby an agent device having various circuitry (processing, storage, communication, sensor etc.) is manufactured. The agent device may comprise a flexible substrate in or on which the various circuitry is provided.

At S102, the agent device is provisioned with identifier data, which may be used to identify the agent device and different aspects thereof. The identifier data may also include authentication data for establishing trust/authentication between the agent device and another resource, such as a data processing device. The identifier data may be provisioned on the device by a manufacturer or any suitable party, although the claims are not limited in this respect.

At S104, the agent device is applied to packaging for goods, and provisioned with further device data, such as state data and operational data.

At S106, the agent device, using the sensor circuitry thereon (e.g. temperature sensor, chemical sensor, humidity sensor, light sensor, weight sensor etc.) senses data and stores the sensed data in storage circuitry thereon. The sensed data may be generated continuously or periodically.

At S108, the agent device processes the sensed data locally to determine whether the sensed data is within parameters specified in the operational data.

At S110, the agent device performs one or more actions in response to the determination at S108. For example, when the agent device determines that the sensed data is within the specified parameters, the agent device may return to S106 and continue to generate sensed data.

On the other hand, when the agent device determines that the sensed data fell outside the specified parameters, the agent device may dynamically update the state data on the agent device using an algorithm in the device data (e.g. adjusting an expected expiration date), or for example, the agent device may notify an owner of the agent device (e.g. by displaying a human readable code on a display).

Whilst S108 and S110 describe the agent device performing local processing using the processing circuitry provided thereon, the agent device may, in other examples, transmit the device data thereon to a remote resource (S112). Such a transmission may occur in response to a command communication from the remote resource requesting that the agent device transmit the device data. Alternatively, the agent device may transmit the device data to one or more devices (e.g. as a multicast or a broadcast transmission), whereby such transmissions may be performed continuously or periodically.

On receiving the device data, the remote resource processes the sensed data, or transmits the device data to a further resource (e.g. a server or a cloud environment) for processing. When it is determined that the sensed data is within the specified parameters, the remote resource may not take any action and the agent device continues to generate sensed data as at S106.

On the other hand, when the remote resource determines that the sensed data fell outside the specified parameters, the remote resource transmits one or more command communications to the agent device, the command communications comprising command data recognised by the agent device as denoting one or more actions to be taken thereby. Such actions may include those as described above in S110, whereby the agent device is instructed to update state data thereon, or whereby the agent device is instructed to update a display thereon. In other examples, the remote resource may also update an owner of the agent device as to the result (e.g. via an SMS message, email etc.)

Furthermore, an action may be to disband the identifier data of the agent device, whereby when it is determined to disband the identifier data at S116, the agent device's identifier data is rendered invalid at S118 (e.g. by a registry resource). Alternatively, the agent device continues to generate sensed data as at S106.

Furthermore, disbanding the identifier data may be an active process, whereby a registry resource automatically disbands the identifier data after set duration. In an alternative example, disbanding the identifier data may be a passive process, whereby disbanding occurs after the agent device fails a challenge-response operation with a remote resource.

At S120, the process ends and the packaging having the agent device applied disposed.

It will be appreciated that wastage may be reduced for goods having agent devices with sensing capabilities applied thereto in comparison to goods which do not have such agent devices applied thereto because the goods can be readily identified and authenticated by data provisioned thereon, and the characteristics or state of the goods can be readily determined, and updated based on the sensed data.

It will also be appreciated that such agent devices may supplement, or replace, one-dimensional barcodes (e.g. UPC & EAN barcodes) and two-dimensional barcodes (e.g. QR code & Datamatrix code barcodes) on product packaging as the characteristics or state of goods can determined using wireless communications rather than optical scanning techniques alone.

Furthermore, rather than relying on relatively expensive equipment to provide smart functionality (e.g. smart refrigerators having cameras and associated complex machine learning techniques), the device data on the agent devices can be transmitted to a remote resource via wireless communications, and used for identification and tracking purposes and for providing smart functionality using the remote resource.

Embodiments of the present techniques further provide a non-transitory data carrier carrying code which, when implemented on a processor, causes the processor to carry out the methods described herein.

The techniques further provide processor control code to implement the above-described methods, for example on a general-purpose computer system or on a digital signal processor (DSP). The techniques also provide a carrier carrying processor control code to, when running, implement any of the above methods, in particular on a non-transitory data carrier or on a non-transitory computer-readable medium such as a disk, microprocessor, CD- or DVD-ROM, programmed memory such as read-only memory (firmware), or on a data carrier such as an optical or electrical signal carrier. The code may be provided on a (non-transitory) carrier such as a disk, a microprocessor, CD- or DVD-ROM, programmed memory such as non-volatile memory (e.g. Flash) or read-only memory (firmware). Code (and/or data) to implement embodiments of the techniques may comprise source, object or executable code in a conventional programming language (interpreted or compiled) such as C, or assembly code, code for setting up or controlling an ASIC (Application Specific Integrated Circuit) or FPGA (Field Programmable Gate Array), or code for a hardware description language such as Verilog™ or VHDL (Very high speed integrated circuit Hardware Description Language). As the skilled person will appreciate, such code and/or data may be distributed between a plurality of coupled components in communication with one another. The techniques may comprise a controller which includes a microprocessor, working memory and program memory coupled to one or more of the components of the system.

Computer program code for carrying out operations for the above-described techniques may be written in any combination of one or more programming languages, including object oriented programming languages and conventional procedural programming languages. Code components may be embodied as procedures, methods or the like, and may comprise sub-components which may take the form of instructions or sequences of instructions at any of the levels of abstraction, from the direct machine instructions of a native instruction set to high-level compiled or interpreted language constructs.

It will also be clear to one of skill in the art that all or part of a logical method according to the preferred embodiments of the present techniques may suitably be embodied in a logic apparatus comprising logic elements to perform operations of the above-described methods, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In an embodiment, the present techniques may be realised in the form of a data carrier having functional data thereon, said functional data comprising functional computer data structures to, when loaded into a computer system or network and operated upon thereby, enable said computer system to perform operations of the above-described method.

In the context of the present application, the term "data" as referred to herein (e.g., as modified as "state data," "device data," "identifier data," "authentication data," "sensed data," "operational data," etc.) is to mean a physical signal and/or state that expresses and/or represents one or more values, parameters, conditions, symbols, portions of images, measurements and/or computation results. In one embodiment, such data may comprise a physical signal and/or state maintained on a tangible storage device (e.g., volatile or non-volatile memory device). In another embodiment, such data may comprise a physical and/or state being transmitted in a communication transmission medium (e.g., wherein the physical and/or state modulates one or more physical signals in the communication transmission medium).

In the preceding description, various embodiments of claimed subject matter have been described. For purposes of explanation, specifics, such as amounts, systems and/or configurations, as examples, were set forth. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all modifications and/or changes as fall within claimed subject matter.

As will be appreciated from the foregoing specification, techniques are described providing a data processing device which can be applied to packaging for associated goods.

The device may comprise: sensor circuitry to generate sensed device data, and wherein the device is configured to store the sensed device data in the storage circuitry, process the sensed device data and/or transmit the sensed device data to a remote resource.

The device may actively generate the sensed device data.

The sensor circuitry may comprise one or more of: a temperature sensor, a chemical sensor, a humidity sensor, a light sensor, a weight sensor, an orientation sensor and an accelerometer sensor.

The device may further comprise power circuitry having one or more of a: persistent power source and an energy harvester, wherein the energy harvester may comprise one or more of: a vibration harvester, a radio frequency harvester, a light harvester and a thermal energy harvester.

The device data may comprise operational data comprising one or more of: operating parameters for the agent device and an algorithm to determine updated device data in response to the sensed data.

The device data may comprise state data relating to one or more goods to which the device is applied.

The device may be configured to update the state data in response to processing the device data or wherein the device may be configured to update the state data in response to a command communication received from the remote resource.

The state data may comprise an expiration date of goods associated therewith.

The device data may comprise identifier data, wherein the identifier data comprises one or more of: a device identifier and authentication data.

The communication circuitry may comprise one or more of: wireless communication circuitry and a display.

In embodiments, one or more of storage circuitry, processing circuitry, communication circuitry, power circuitry and sensor circuitry is printed on or in the substrate.

Techniques are also described providing methods for determining a state or characteristic of goods to which a claimed device is applied.

Techniques are also described providing methods for updating state data on a claimed device, whereby such state data may include an expiration date of associated goods Techniques are described providing a system having a claimed data processing device and a remote resource in communication therewith.

The system may further comprise a second remote resource arranged in communication with the first remote resource, wherein the second remote resource may be a cloud environment.

What is claimed is:

1. A data processing device, for applying to packaging, the device having a flexible substrate, the flexible substrate comprising:
   storage circuitry to store device data therein, wherein the device data comprises state data relating to the state or characteristics of one or more goods;
   processing circuitry to process the device data;
   communication circuitry to communicate with a remote resource to transmit the device data thereto;
   sensor circuitry to generate sensed device data; and
   circuitry to provide active actuation in response to the sensed device data,
   wherein the device is configured to update the state data based on or in response to the sensed device data.

2. The device according to claim 1, wherein the device actively generates the sensed device data.

3. The device according to claim 1, wherein the sensor circuitry comprises: a temperature sensor, a chemical sensor, a humidity sensor, a light sensor, a weight sensor, an orientation sensor, an object presence sensor, a fluid level sensor or an accelerometer sensor, or a combination thereof.

4. The device according to claim 1, further comprising power circuitry having a persistent power source and/or an energy harvester.

5. The device according to claim 4, wherein the energy harvester comprises: a vibration harvester, a radio frequency harvester, a light harvester or a thermal energy harvester, or a combination thereof.

6. The device according to claim 1, wherein the device data comprises operational data comprising operating parameters for the data processing device and/or an algorithm to determine updated device data in response to the sensed data.

7. The device according to claim 1, wherein the device is configured to update the state data in response to a command communication received from the remote resource.

8. The device according to claim 1, wherein the state data comprises an expiration date of goods associated therewith.

9. The device according to claim 1, wherein the device data comprises identifier data.

10. The device according to claim 9, wherein the identifier data comprises a device identifier and/or authentication data.

11. The device according to claim 1, wherein the communication circuitry comprises wireless communication circuitry and/or a display.

12. The device according to claim 1, wherein storage circuitry, processing circuitry or communication circuitry, or a combination thereof, is printed on or in the substrate.

13. A method of updating data on a data processing device comprising flexible substrate, the method comprising:
   provisioning, at storage circuitry of the data processing device, state data relating to a state and/or characteristics of one or more goods;
   generating, at sensor circuitry of the device, sensed data;
   processing, at the data processing device, the sensed data;
   updating, on the storage circuitry at the data processing device, the state data in response to the processed sensed data; and
   providing active actuation in response to the sensed data.

14. A computer program product stored on a non-transitory computer-readable medium and comprising computer readable code to be executable by one or more processors of a data processing device to:
   provision, at storage circuitry of the data processing device, state data relating to a state and/or characteristics of one or more goods;
   generate, at sensor circuitry of the data processing device, sensed data;
   process, at the data processing device, the sensed data;
   update, on the storage circuitry at the data processing device, the state data in response to the processed sensed data; and
   provide active actuation in response to the sensed data.

* * * * *